March 27, 1962     N. B. KELL     3,026,976
BRAKE ADJUSTER

Filed July 22, 1960     2 Sheets-Sheet 1

INVENTOR.
Nathaniel B. Kell
BY
His Attorney

March 27, 1962 — N. B. KELL — 3,026,976
BRAKE ADJUSTER
Filed July 22, 1960 — 2 Sheets-Sheet 2

INVENTOR.
Nathaniel B. Kell
BY
His Attorney

United States Patent Office 3,026,976
Patented Mar. 27, 1962

3,026,976
BRAKE ADJUSTER
Nathaniel Barnett Kell, Indianapolis, Ind., assignor to General Motors Corporation, Detroit, Mich., a corporation of Delaware
Filed July 22, 1960, Ser. No. 44,759
7 Claims. (Cl. 188—196)

This invention relates to a vehicle drum brake and more particularly to an automatic brake adjuster for a vehicle drum brake.

With the operation of the vehicle drum brake, a certain amount of wear is incurred on the brake shoe linings which frictionally engage the inner periphery of the brake drum. This wear on the brake shoes is overcome by adjustment of the clearance between the brake shoes and the brake drum from time to time. The additional service cost and inconvenience of adjusting a vehicle brake manually may be eliminated through installation of an automatic brake adjuster.

Accordingly, this invention is intended to overcome the need for manual adjusting of the brakes. It provides the additional feature of retracting the brake shoes from the inner periphery of the brake drum for ease of removal of the brake drum for repair of the vehicle brakes. The adjuster also has means which conveniently provide a manner for presetting a clearance between the brake shoes and the brake drum as may be desired by the operator of the vehicle.

It is an object of this invention to provide an automatic brake adjuster operating within the hydraulic wheel cylinder of a vehicle drum brake.

It is another object of this invention to provide in combination with the adjuster a means for retracting the brake shoes for ease in dismantling the brake drum from the brake shoes.

It is a further object of this invention to provide a means for presetting the adjusting screw within the hydraulic wheel cylinder without disassembling the cylinder from the braking means.

The objects of this invention are accomplished by employing a brake shoe pivotally mounted on the backing plate on one end for frictionally engaging the inner periphery of a rotating brake drum concentrically mounted about the outer periphery of the brake shoe. A hydraulic wheel cylinder is mounted to operate the opposite end of the brake shoe. A retraction means connected to the backing plate also engages this opposite end of the brake shoe to retract the brake shoe from the brake drum. The hydraulic wheel cylinder includes a clearance sleeve mounted within the wheel cylinder which operates in its retracted position against a preset clearance control screw.

Internally within the sleeve is mounted the hydraulic piston carrying an adjusting screw operated by a prewound spring. As the brakes are actuated, the clearance sleeve and the piston operate together until the sleeve bottoms out against a stop beyond which the piston operates individually. Any excessive clearance between the head of the adjusting screw and the end of the clearance sleeve permits the prewound spring to unscrew the adjusting screw providing the necessary adjustment of the brake shoes.

As the wheel cylinder and clearance sleeve return to their retracted position, the clearance between the clearance sleeve and the stop in the wheel cylinder determines the clearance between the brake shoes and the brake drum.

Further objects and advantages of the present invention will be apparent from the following description, reference being had to the accompanying drawings wherein preferred embodiments of the present invention are clearly shown.

In the drawings:

FIGURE 1 shows the braking structure and the relative positions of the parts within the brake drum. The external portions of the fluid system are located in a schematic portion of the view in FIGURE 1.

Figure 1:
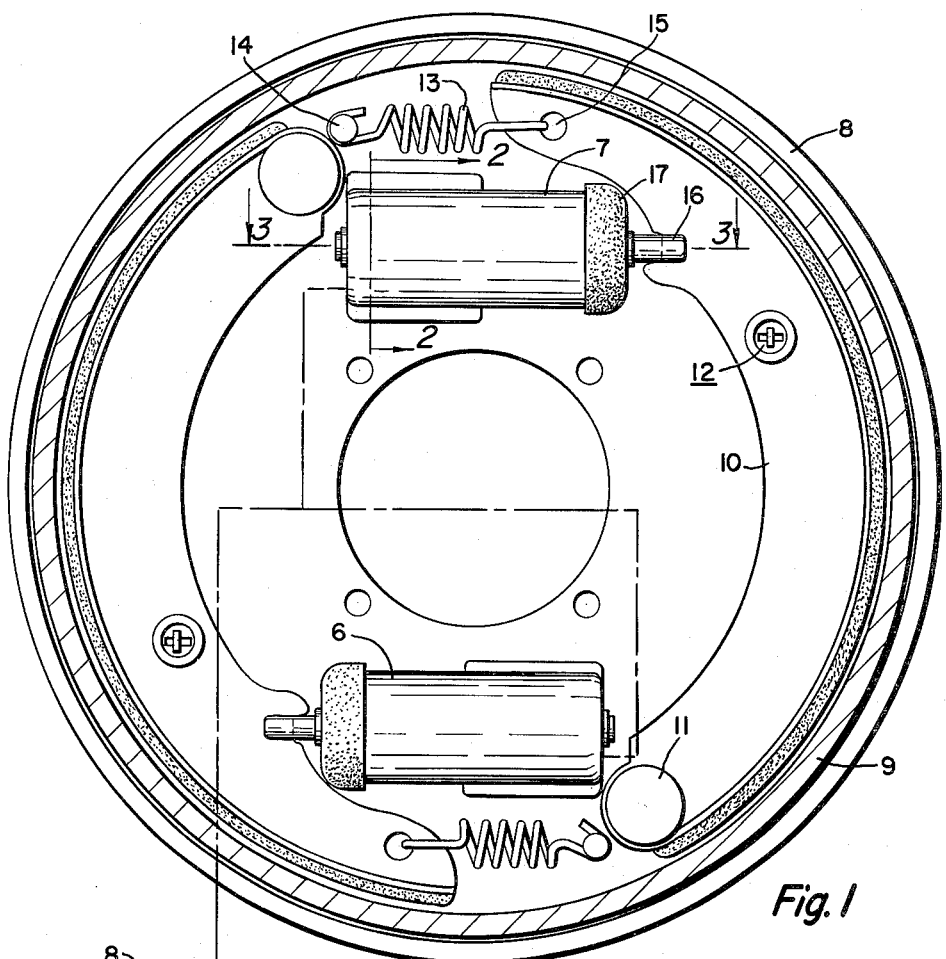
FIGURE 1 is a side elevation view of the vehicle brake with the brake drum shown in cross-section to show the related parts of the braking means.

A brake pedal 1 is pivotally mounted on the chassis 2 and is pivotally connected to the push rod 3. The push rod 3 operates to pressurize fluid within the master cylinder 4 which is connected by conduit means 5 to the hydraulic wheel cylinders 6 and 7. The wheel cylinders 6 and 7 are mounted on the backing plate 8. The cylinders 6 and 7 and their related parts are identical and operate identical brake shoes within the rotating drum 9. The brake shoe 10 is pivotally mounted by means of a pin 11 which is connected to the backing plate 8. A hold-down pin assembly 12 together with pin 11 retain the brake shoe in its relative position with the backing plate. The opposite end of the brake shoe is connected by a retraction spring 13 which is connected by the rivet 14 to the backing plate. The opposite end of the retraction spring 13 engage perforation 15 in the brake shoe webbing of brake shoe 10.

The hydraulic wheel cylinder 7 is provided with a push rod 16 having a bifurcated portion engaging the webbing of the brake shoe 10. A dust seal 17 seals the end of the cylinder 7 to prevent foreign material from entering the interior of the cylinder.

Figure 2:
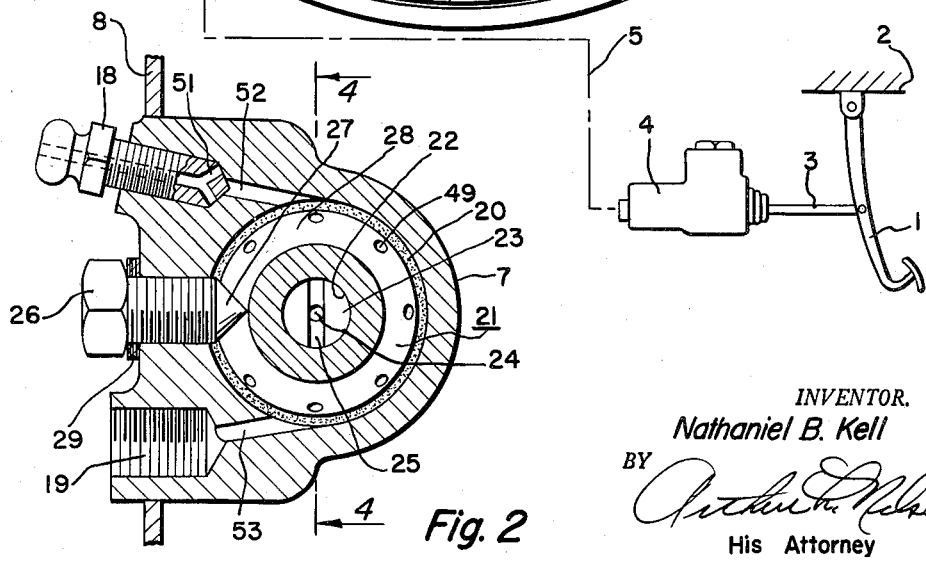
FIGURE 2 is an enlarged cross-section view taken on line 2—2 of FIGURE 1.

Referring to FIGURE 2, the cylinder 7 is shown in cross-section. The casting is mounted on the backing plate with an opening 51 for the bleeder nut 18 and a passage means 19 which is in communication with the conduit means 5. The passage means 19 leads to the interior portion of the wheel cylinder through passage 53. A seal 20 is placed on the outer periphery of the clearance sleeve 21. The clearance sleeve 21 has an end portion shown in cross-section with an opening 22 showing the end portion of the brake adjusting screw 23. The brake adjusting screw 23 has a central opening 24 extending through the screw to prevent hydraulic lock of the screw during operation of the screw by the torsion spring. A screw driver slot 25 is also provided in the end of the screw to permit manual preset adjustment of the adjusting screw 23 upon installation of the adjusting screw in the wheel cylinder.

A clearance control screw 26 is thereadedly retained in the portion of the cylinder engaging the backing plate. The clearance control screw is firmly seated on a plurality of shims 29 between the screw 26 and the casting on the wheel cylinder 7. The number of shims control the preset clearance between the brake shoe and the brake drum. The cone-shaped portion 27 on the screw 26 engages a mating cone-shaped portion 28 on the clearance sleeve 21.

Figure 3:
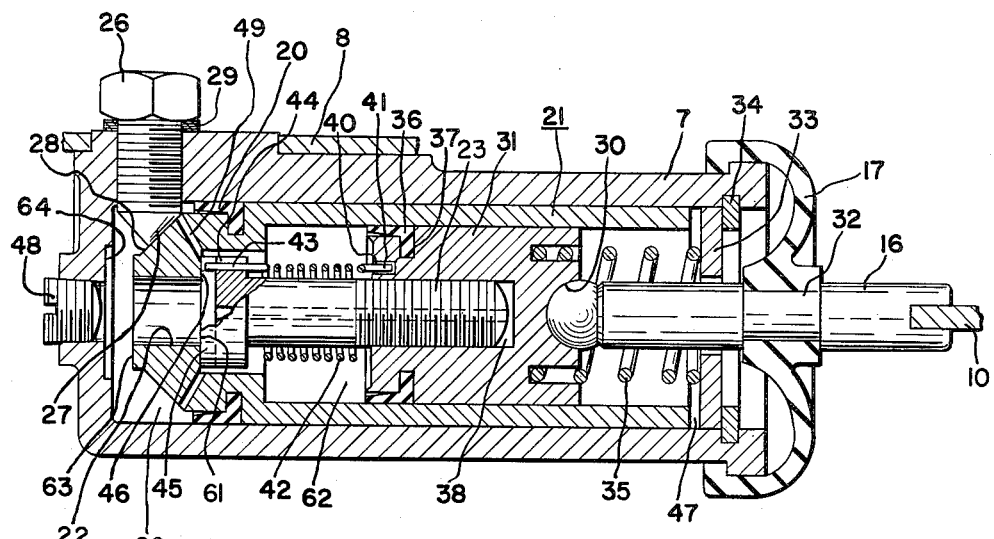
FIGURE 3 is an enlarged cross-section view taken on line 3—3 of FIGURE 1.

FIGURE 3 illustrates the interior of the hydraulic wheel cylinder. The push rod 16 engages the webbing of the brake shoe 10 and extends inwardly to engage a hemispherical seat 30 on the outward end of the piston 31. The push rod has an annular recess 32 for reception of the seal 17 which fits about the outer periphery of the cylinder 7. The push rod 16 extends through an annulus 33 which is maintained in its position by a snap ring 34. The piston 31 is biased to the position shown by the spring 35. The forward end of the piston receives a seal 36 in an annular recess 37. A central opening 38 in the forward end of the piston 31 is threaded to receive brake adjusting screw 23. An opening 40 eccentric of the central opening 38 is formed to receive an axially extending prong 41 of the spring 42. The opposite end of the spring 42 is formed with a second axially extending prong 43 for reception within the opening 44 of the screw head 45. The spring 42 is pre-wound before assembling within the piston. In other words, the spring is under a torsion force and will unscrew the brake adjusting screw 23 from the piston 31 when the screw is not contacting the end facing 46 of the clearance adjusting sleeve 21.

The cone-shaped portion 28 of the clearance sleeve 21 is more clearly shown in this view engaging the cone-shaped portion 27 of the clearance control screw 26. It is noted that the less the number of shims 29, the farther the clearance control screw is permitted to enter into the wheel cylinder 7. This in turn biases clearance adjusting sleeve 21 to the right and reduces the clearance 47 between the clearance adjusting sleeve 21 and the annulus 33.

A tapered screw 48, when removed, permits the insertion of a screw driver to preset the brake adjusting screw 23 without complete disassembly of the wheel cylinder unit. A plurality of passages 49 are formed in the end of the clearance sleeve to permit fluid to pass into the sleeve.

Figure 4:
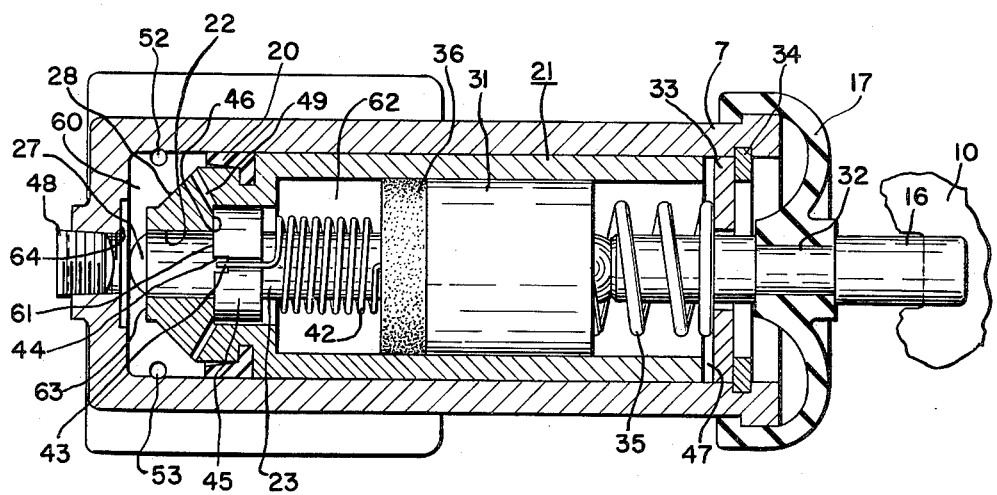
FIGURE 4 is a cross-section view taken on line 4—4 of FIGURE 2.

FIGURE 4 shows a cross-section of the wheel cylinder 7 at a plane 90° rotated from the section cut by FIGURE 3. Inner portions of the piston are not shown in cross-section, but the related parts within the clearance sleeve are shown in detail to clarify their related functions in contrast to the illustration shown in FIGURE 3. The opening 52 leads to a passage 51 for bleeding of the wheel cylinder. The opening 53 is the inlet opening in communication with the passage 19.

The following is a description of the operation of the automatic brake adjuster. The brake ajusting screw 23 upon assembly is rotated to prewind the spring 42 relative to the piston 31. This may be done by inserting the piston and the screw with a spring assembled in the clearance sleeve. The cap screw 48 is removed and a screw driver is inserted in the screw slot 25 in the end of the screw 23 to prewind the spring 42 and rotate the screw in the threaded portion of the piston 31. The screw is bottomed out in the bottom of the opening 38 and then counter-rotated to prevent the screw from locking on the bottom of the hole 38.

As the vehicle brakes are actuated, the brake pedal 1 is depressed thereby compressing fluid within the master cylinder 4, the conduit means 5, the pressurizing chamber 60 and the fluid chamber 62 in the wheel cylinder 7. The pressurization of fluid in the chamber 60 drives the clearance sleeve 21 and the piston 31 axially until the clearance adjusting sleeve 21 bottoms out on the annulus 34. If an excessive clearance exists between the brake shoe and the brake drum, the piston 31 will continue to move axially thereby permitting clearance between the facing 46 on the clearance sleeve 21 and the facing 61 on the head 45. The prewound tension of the spring 42 unwinds the screw thereby elongating the screw 23 relative to the piston 31. The unscrewing of the adjusting screw 23 automatically takes up the excessive clearance between the brake shoe and the brake drum as the shoe is retracted.

As the vehicle brakes are released, the fluid within the pressurizing chamber 60 and the fluid chamber 62 is permitted to return through the passage 49 to the master cylinder 4. This in turn permits the retraction spring 13 on the brake shoe and the spring 35 within the cylinder 7 to return the piston 31 to its normally retracted position and reseat the clearance sleeve 21 on the clearance control screw 26. The adjustment of the brake shoe relative to the brake drum is thus accomplished.

The clearance 47 is controlled by the number of shims 29 under the clearance control screw 26. This may be changed according to the desire of the operator of the motor vehicle.

In the event that the brake drum is removed from the brake shoe, it is sometimes desirable to completely retract the brake shoes and provide additional clearance between the shoes and the drum. This may be accomplished by completely removing the screw 26. When the clearance control screw 26 is completely removed the clearance sleeve 21 and the piston 31 move axially to the left until the facing 63 on the clearance sleeve 21 engages the wall 64 of the cylinder 7. This provides additional clearance between the brake shoe and brake drum for ease in removal of the brake drum from the braking means.

While the embodiments of the present invention as herein disclosed constitute preferred forms, it is to be understood that other forms might be adopted.

What is claimed is as follows:

1. In a vehicle brake, an automatic brake adjuster adapted for operation in a brake including a backing plate, a brake drum, a brake shoe means pivotally mounted on said backing plate for engaging said drum, a retraction spring for said brake shoe means, said adjuster comprising a hydraulic wheel cylinder for said brake shoe means adapted for mounting on said backing plate, a clearance sleeve mounted within said cylinder, a stop member in said wheel cylinder engageable by said clearance sleeve, a clearance screw for maintaining a predetermined clearance between said clearance adjusting sleeve and said stop member within said cylinder, a piston operating within said clearance adjusting sleeve, a brake adjusting screw threadedly mounted within a threaded opening in the end of said piston, a preloaded torsion spring engaging said piston and the head of said screw to automatically unscrew and elongate said adjusting screw relative to said piston when an excessive clearance exists between said brake shoe means and said brake drum when said vehicle brakes are actuated.

2. In a vehicle brake, an automatic brake adjuster adapted for operation of a brake comprising in combination, a backing plate, a brake drum, a brake shoe means pivotally mounted on said backing plate for engaging said drum, a retraction spring connected to said brake shoe means and said backing plate, said brake adjuster including a hydraulic wheel cylinder adapted for mounting on said backing plate for engaging said brake shoe means, a clearance sleeve for concentric operation within said wheel cylinder, a stop member mounted within said wheel cylinder positioned a predetermined distance from the end of said clearance sleeve, a clearance control screw threadedly engaging a portion of said wheel cylinder and extending into said wheel cylinder to engage said clearance sleeve to provide a predetermined clearance between the clearance sleeve and said stop member, a hydraulic piston in said clearance sleeve adapted for operating said brake shoe means, a clearance adjusting screw threadedly engaging an opening in the end of said hydraulic piston a prewound torsion spring around said clearance adjusting screw, said prewound torsion spring engaging said piston and the head of said screw to bias and unscrew said screw to an extended position relative to said piston when said brakes are actuated if a greater distance existed between said brake shoe means and said brake drum than between the end of said clearance sleeve and said stop member in said wheel cylinder in their retracted positions.

3. In a vehicle brake, an automatic brake adjuster adapted for operation in a brake comprising in combination, a backing plate, a brake drum, brake shoe means, said brake shoe means being pivotally mounted on said backing plate, a retraction spring for said brake shoe means, said brake adjuster including a wheel cylinder assembly adapted for operating with said brake shoe means and adapted for mounting on said backing plate, a clearance sleeve mounted concentrically within said wheel cylinder, a stop member within said wheel cylinder, a clearance control screw threadedly engaging the portion of said wheel cylinder extending into said wheel cylinder to preset a clearance between said stop member and the end of said clearance sleeve and to provide a clearance between the opposite end of said clearance sleeve and the end wall of said wheel cylinder, a piston operating concentrically within said clearance sleeve, a push rod adapted for connection to the end of said piston and connected to said brake shoe means, a clearance adjusting screw threadedly engaging the end of said piston and contacting a portion of said clearance adjusting sleeve, a prewound torsion spring engaging the end of said piston and the head of said clearance adjusting screw to extend said screw relative to said piston by rotation of said screw when said brakes are actuated if a greater clearance existed between the end of said clearance sleeve and said stop member than between said brake shoe means and the brake drum of said braking means in their retracted position.

4. In a vehicle brake, an automatic brake adjuster adapted for operation in a brake comprising in combination, a brake drum, a backing plate, a brake shoe means, said brake shoes pivotally mounted on said backing plate for engaging said brake drum, a retraction spring engaging said brake shoe means, said brake adjuster including a hydraulic wheel cylinder adapted for mounting on said backing plate, a clearance sleeve concentrically mounted within said wheel cylinder, a piston mounted within said clearance sleeve, said piston adapted for contacting said brake shoe means, an adjusting screw threadedly engaging the end of said piston, a prewound spring around said adjusting screw, said prewound spring engaging the head of said adjusting screw and the end portion of said piston to elongate said screw relative to said piston when the contacting end portion of said clearance sleeve fails to engage the head of said screw during brake actuation, a stop member engaging the end of said clearance sleeve when said vehicle brakes are actuated, a clearance control screw having a cone-shaped end threadedly engaging a portion of said cylinder and extending to engage a mating portion on the end of said clearance sleeve to maintain a predetermined preset clearance between the opposite end of said clearance sleeve and said stop member and also provide a clearance between the sleeve end contacting said clearance screw between the end portion of said wheel cylinder of said clearance sleeve, the removal of said clearance control screw permitting the movement of said piston to further retract the brake shoe means to permit ease in disassembly of the brake drum from the brake shoe means when dismantling the braking means.

5. In a vehicle brake, an automatic brake adjuster adapted for operating with a brake comprising in combination, a backing plate, a brake drum, a plurality of brake shoes, each of said shoes pivotally mounted on said backing plate and frictionally engaging said drum, a retraction spring engaging each of said brake shoes, said brake adjuster including a wheel cylinder adapted for mounting on said backing plate, a clearance sleeve concentrically mounted within said wheel cylinder, a stop member for engaging the end portion of said clearance sleeve in the brake operating position, a clearance screw having a cone-shaped portion extending into said wheel cylinder, a mating portion on said clearance sleeve engaging said clearance control screw and providing a predetermined clearance between the end of said clearance sleeve and said stop member, a piston operating within said clearance sleeve, said piston adapted for connection to said brake shoe, an adjusting screw threaded in the end portion of said piston, a prewound torsion spring engaging said piston and the head of said adjusting screw to elongate said adjusting screw when a clearance exists between said sleeve and said screw head, a concentric opening in said cylinder for receiving an end plug, said opening extending through said wheel cylinder and said clearance sleeve to permit presetting of said adjusting screw to initially preset the proper position of said screw relative to said piston in assembly of said vehicle brakes.

6. In a vehicle brake, an automatic brake adjuster adapted for operation in a brake comprising in combination, a backing plate, a brake drum, a plurality of brake shoes, each of said brake shoes pivotally mounted on said backing plate, a retraction spring engaging each of said brake shoes, a brake adjuster including a hydraulic wheel cylinder adapted for mounting on said backing plate, a clearance sleeve concentrically mounted within said wheel cylinder, a stop member located internally of said wheel cylinder a predetermined distance from said clearance sleeve, said clearance sleeve being of a cup-shape for reception of a piston, a piston in said clearance sleeve, said piston adapted for connection to said brake shoe, a clearance adjusting screw threadedly engaging the opposite end of said piston, a prewound torsion spring engaging said opposite end of said piston, said prewound torsion spring engaging said opposite end of said piston and the head of said adjusting screw to provide rotation and elongation of said screw relative to said piston when a clearance exists between said screw head and the engaging surface of said clearance sleeve as said vehicle brakes are actuated.

7. In a vehicle brake, an automatic brake adjuster for operation in a brake comprising in combination, a backing plate, a brake drum, a plurality of brake shoes each of said brake shoes pivotally mounted on said backing plate for frictionally engaging said drum, a retraction spring connected to each of said brake shoes, said brake adjuster including a hydraulic wheel cylinder for operating each of said brake shoes adapted for mounting on said backing plate, a clearance sleeve concentrically mounted within said wheel cylinder, a stop member in said wheel cylinder engageable by said clearance sleeve, a clearance control means for presetting a predetermined distance between the clearance sleeve and said stop member in said wheel cylinder, a piston mounted concentrically within said clearance sleeve, a brake adjusting screw threadedly mounted in said piston, and engaging said clearance sleeve in the normally retracted position, a prewound torsion spring engaging said piston and said screw to provide an elongation by rotation of said adjusting screw relative to said piston when a clearance exists between said adjusting screw and said clearance sleeve as said vehicle brakes are actuated.

References Cited in the file of this patent
UNITED STATES PATENTS

| | | |
|---|---|---|
| 2,205,889 | Mabrito | June 25, 1940 |
| 2,293,600 | Eksergian | Aug. 18, 1942 |
| 2,748,901 | Brooks | June 5, 1956 |
| 2,775,321 | Phillips | Dec. 25, 1956 |